3,111,737
MAGNETIC FASTENER
Edward K. Heil, Southington, Conn., assignor to North & Judd Manufacturing Company, New Britain, Conn., a corporation of Connecticut
Filed Apr. 2, 1962, Ser. No. 184,144
4 Claims. (Cl. 24—201)

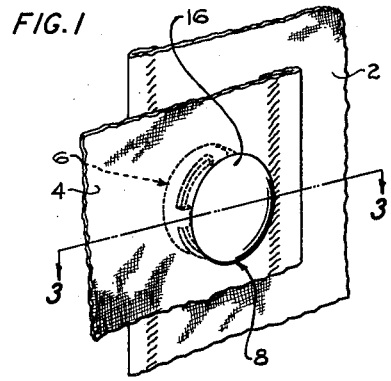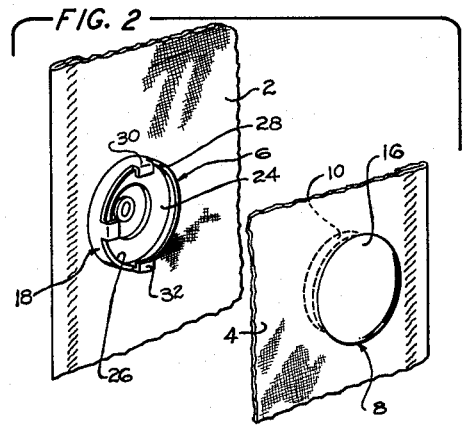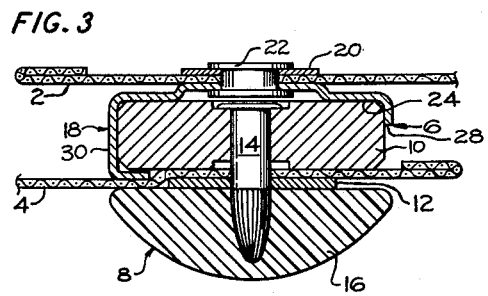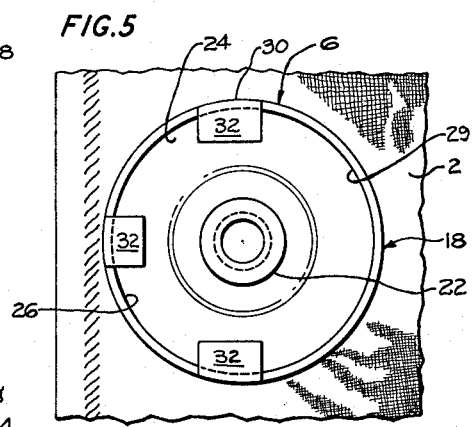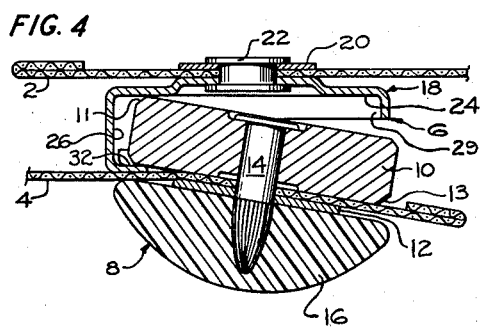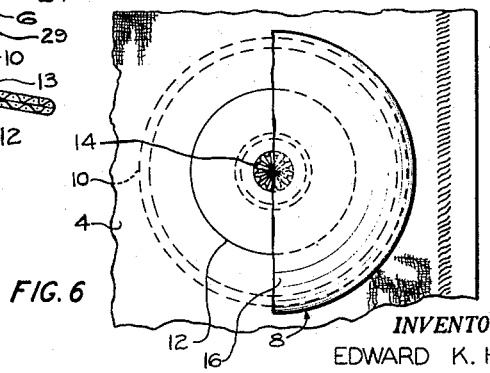
INVENTOR.
EDWARD K. HEIL
BY Lindsey, Prutzman and Hayes
ATTORNEYS United States Patent Office 3,111,737
Patented Nov. 26, 1963

This invention relates to magnetic fasteners and more particularly to compact magnetic fasteners adapted for use on belts, garments and the like.

It is an object of the present invention to provide a magnetic fastener which produces a highly effective clasp essentially safeguarded from inadvertent disassembly and which can be quickly and conveniently manipulated.

Another object is to provide a magnetic fastener which is compact and relatively economical to manufacture and install and which is adapted for incorporating highly ornamental designs upon its exterior element.

Other objects will be in part obvious and in part pointed out more in detail hereinafter.

The invention accordingly consists in the features of construction, combination of elements and arrangement of parts which will be exemplified in the construction hereafter set forth and the scope of the application which will be indicated in the appended claims.

In the drawings:

FIG. 1 is a perspective view of a magnetic fastener embodying the invention as attached to and fastening overlapping flaps of a garment;

FIG. 2 is a perspective view similar to FIG. 1 wherein the elements of the fastener have been unclasped;

FIG. 3 is an enlarged fragmentary cross-sectional view taken along the line 3—3 of FIG. 1;

FIG. 4 is a cross-sectional view similar to FIG. 3 but showing the relative positioning of the fastener elements during assembly or disassembly;

FIG. 5 is a front view of the inner fastener member of FIG. 2; and

FIG. 6 is a front view of the outer fastener member.

Referring now in detail to the attached drawings, overlapping flaps 2 and 4 of a fragmentarily illustrated garment such as a raincoat or belt are secured together by a magnetic fastener embodying the present invention and which is generally comprised of a receiver member 6 and button member 8 secured to the inner and outer flaps 2 and 4, respectively.

As best shown in FIGS. 3 and 6, the button member 8 is comprised of the generally cylindrical permanent magnet 10 and the backing plate 12 disposed on the inner and outer surfaces of the flap 4 which are secured together by the pin 14. An ornamental cover or button 16 of any suitable configuration preferably is placed upon the outer surface of the backing plate 12 for aesthetic considerations and may be secured thereto by having the end of the pin 14 fastened therein. Although the backing plate 12 and permanent magnet 10 may be secured together by stitching, the illustrated pin retention system has proven facile and highly effective and the pin may be secured directly to the backing plate 12 as by staking. The inner and outer edges of the permanent magnet 10 are preferably beveled, as indicated by the numerals 11 and 13, for a purpose to be described more fully hereinafter.

As best shown in FIGS. 2–3 and 5, the receiver member 6 is comprised of the generally cup-shaped element 18 and backing plate 20 disposed on the inner and outer surfaces of the flap 2 which are secured together by the rivet 22. Although the backing plate 20 and cup-shaped element may be secured together by stitching, the illustrated rivet or eyelet retention system has proven itself highly facile and effective. The cup-shaped element 18 is fabricated from a magnetically susceptible metal such as steel and provides a generally planar transverse wall 24, which is firmly engaged with the permanent magnet 10, and an upstanding peripheral wall 26. As illustrated, the cup-shaped element 18 is integrally formed and is dimensioned and configured to snugly receive the permanent magnet 10 within the confines of the peripheral wall 26 so that there will be a very high degree of magnetic attraction between all juxtaposed surfaces.

The peripheral wall 26 is provided with a notch or cut-out 28 at the side opposite the direction of separation between the flaps to permit insertion of the magnet 10 into the cup-shaped element 18 by movement generally laterally thereof.

As illustrated, the notch 28 is dimensioned to permit the permanent magnet to be easily inserted therethrough and to provide a rim portion 29 which extends upwardly of the beveled edge 11 of the magnet 10 when the latter is received therein so as to ensure a snug seat for the permanent magnet.

To prevent inadvertent disassembly by forces applied normally to the axis of the fastener, the magnet 10 is locked in the cup-shaped element 18 by three spaced fingers 30 which project from the unnotched portion of the wall and have tab portions 32 extending generally radially inwardly of the element 18 and parallel to the transverse wall 24. The wall 26 and fingers 30 are so dimensioned that when the permanent magnet 10 is inserted into the cup-shaped element 18, the tab portions 32 will closely overlie the margins of the magnet 10 adjacent the unnotched portion of the wall 26 and in cooperation with the wall 26 will limit inadvertent disengagement of the permanent magnet from the receiver member 6 by forces tending to overcome the attractive force of the magnet 10.

Referring now to the operation of the fastener, clasping of the elements is conveniently accomplished by inserting the permanent magnet 10 of the button member 8 through the notched portion 28 of the receiver member wall 26 at an acute angle to the transverse wall 24 so that the permanent magnet 10 will slide under the tab portions 32 as shown in FIG. 4 and be snugly received in the cup-shaped element 18 whereby the magnetic forces of attraction will become effective to firmly hold the elements together. The bevels 11 and 13 on the inner and outer edges of the magnet 10 provide guide surfaces facilitating entry and removal thereof, and the inner bevel 11 accommodates the radius of curvature required in integrally forming the cup-shaped element 18 so as to enable extremely close fit between the sidewalls.

As can be seen, separation or unclasping of the elements can only be accomplished after the magnet 10 has been pivoted slightly to clear the rim 29 as shown in FIG. 4. This initial pivotal movement which is essential to the removal of the magnet from the pan-like element effectively necessitates intentional manipulation and hence there is great insurance that the fastener of the present invention will not be inadvertently disengaged. Additionally, the clasping and unclasping of the fastener assembly is facile and speedy.

In addition to the above-described advantages of effectiveness of clasping action and ease of operation, the elements of the fastener of the present invention are adapted to mass production at relatively low cost and are further such that they may be efficiently and economically attached for use on wearing apparel or other connectable members.

As will be apparent to persons skilled in the art, various modifications and adaptations of the structure above-described will become readily apparent without departure from the spirit and scope of the invention, the scope of which is defined in the appended claims.

I claim:
1. A magnetic fastener for overlapping flaps of garments and the like comprising a magnet member having a permanent magnet and means for attachment to one of the overlapping flaps; and a receiver member having a transverse wall of magnetically susceptible metal engaged with said permanent magnet and an upstanding peripheral wall dimensioned and configured to receive said permanent magnet therein, said peripheral wall having a notched-out portion dimensioned to permit entry of said magnet member into engagement in said receiver member by movement generally laterally thereof, the unnotched portion of said peripheral wall having a flange extending laterally inwardly of the receiver member and overlying the outer surface of the permanent magnet to limit movement of said magnet member normally of said receiver member in the engaged position, said receiver member having means for attachment to the other of the overlapping flaps with the notched-out portion of the peripheral wall disposed oppositely of the direction of separation of the flaps.

2. A magnetic fastener for overlapping flaps of garments and the like comprising a magnet member having a generally cylindrical permanent magnet and means for attachment to one of the overlapping flaps; a generally cup-shaped receiver element integrally formed from a magnetically susceptible metal with a transverse wall engaged with said permanent magnet and an upstanding peripheral wall dimensioned and configured to receive said permanent magnet snugly therein, said peripheral wall having a notched-out portion dimensioned to permit entry of said magnet member into said receiver element by movement generally laterally thereof, the unnotched portion of said peripheral wall having a flange portion thereon extending laterally inwardly of the receiver element closely adjacent and overlying the outer surface of the permanent magnet to limit movement of said magnet member normally of the receiver element in the engaged position, and means for attaching said receiver element on the other of the overlapping flaps with the notched-out portion opposite the direction of separation of the flaps.

3. A magnetic fastener for overlapping flaps of garments and the like comprising a magnet member having a generally cylindrical permanent magnet and a backing plate adapted to be secured together on opposite surfaces of one of the overlapping flaps; and a generally cup-shaped receiver integrally formed from a magnetically susceptible metal with a transverse wall engaged with said permanent magnet and an upstanding peripheral wall dimensioned and configured to receive said permanent magnet snugly therein, said peripheral wall having a notched-out portion terminating outwardly from said transverse wall to provide a circumferential rim portion and dimensioned to permit entry of said magnet member into said receiver by movement generally laterally thereof, the unnotched portion of said peripheral wall having spaced fingers thereon extending laterally inwardly of the receiver closely adjacent the outer surface of the permanent magnet to limit movement of said magnet member normally of the receiver in the engaged position, said permanent magnet being engageable within said receiver element by movement generally laterally and at an acute angle to the receiver transverse wall until disposed under the spaced fingers and then pivoting downwardly until seated firmly within the confines of said unnotched peripheral wall portion and circumferential rim portion; and a second backing plate adapted to be placed on the surface of the other of the flaps opposite said receiver and secured thereto to orient said receiver with the notched-out portion opposite the direction of separation of the flaps.

4. A magnetic fastener for overlapping garment flaps and the like comprising a receiver member for one of the flaps including a transverse wall of magnetically susceptible material and an upstanding peripheral wall, said peripheral wall having at least two spaced flanges extending inwardly in spaced overlying relationship with the transverse wall and a notched-out portion between said flanges, a magnet member for the other flap including a permanent magnet having opposite generally planar faces and being dimensioned to be inserted into the receiver member by passage through said notched-out portion and under said flanges, one of said permanent magnet faces being engageable with the transverse wall of the receiver member to be held thereagainst by magnetic attraction and the other face being engageable by the flanges to thereby limit movement of the magnet member in a direction generally normal to the plane of said transverse wall when the magnet member is positioned in the receiver member.

References Cited in the file of this patent
UNITED STATES PATENTS

| | | |
|---|---|---|
| 2,496,691 | Berry | Feb. 7, 1950 |
| 2,615,227 | Hornik | Oct. 28, 1952 |
| 2,637,887 | Goodman | May 12, 1953 |
| 2,867,023 | Putnam | Jan. 6, 1959 |
| 3,027,617 | Gray | Apr. 3, 1962 |
| 3,041,743 | Monsma | July 3, 1962 |

FOREIGN PATENTS

| | | |
|---|---|---|
| 999,770 | France | Feb. 5, 1952 |